(12) United States Patent
Ito et al.

(10) Patent No.: US 12,015,330 B2
(45) Date of Patent: Jun. 18, 2024

(54) VEHICLE-MOUNTED ELECTRIC COMPRESSOR

(71) Applicant: MITSUBISHI HEAVY INDUSTRIES THERMAL SYSTEMS, LTD., Tokyo (JP)

(72) Inventors: Masato Ito, Tokyo (JP); Hiroto Higuchi, Tokyo (JP); Kyohei Watanabe, Tokyo (JP); Sachiko Nakao, Tokyo (JP); Koji Nakano, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 324 days.

(21) Appl. No.: 17/603,491

(22) PCT Filed: Apr. 16, 2020

(86) PCT No.: PCT/JP2020/016771
§ 371 (c)(1),
(2) Date: Oct. 13, 2021

(87) PCT Pub. No.: WO2020/213692
PCT Pub. Date: Oct. 22, 2020

(65) Prior Publication Data
US 2022/0181948 A1 Jun. 9, 2022

(30) Foreign Application Priority Data
Apr. 18, 2019 (JP) .................. 2019-079332

(51) Int. Cl.
*H02K 9/22* (2006.01)
*F04D 25/06* (2006.01)
(Continued)

(52) U.S. Cl.
CPC ............ *H02K 9/22* (2013.01); *F04D 25/06* (2013.01); *H02K 11/25* (2016.01); *H02K 11/33* (2016.01)

(58) Field of Classification Search
CPC ........... H02K 9/22; H02K 11/25; H02K 11/33
(Continued)

(56) References Cited

U.S. PATENT DOCUMENTS

2011/0089881 A1* 4/2011 Shibuya ................ F04B 39/121
318/472
2014/0252583 A1 9/2014 Carletti
(Continued)

FOREIGN PATENT DOCUMENTS

CN 104064351 A 9/2014
CN 104282669 A 1/2015
(Continued)

OTHER PUBLICATIONS

International Search Report for International Application No. PCT/JP2020/016771, dated Jul. 21, 2020, with an English translation.
(Continued)

*Primary Examiner* — Jose A Gonzalez Quinones
(74) *Attorney, Agent, or Firm* — Birch, Stewart, Kolasch & Birch, LLP

(57) ABSTRACT

This vehicle-mounted electric compressor is provided with a compressor body including a motor for compressing a refrigerant, and an inverter including a power element for supplying the motor with electric current. The power element is provided with: a metal substrate having an electrically conductive layer in a partial region of the surface thereof; a heat-generating element having a metal layer solder-fixed to the electrically conductive layer; and a resin substrate which is disposed in parallel with the metal substrate in a plate thickness direction of the metal substrate, and has a metal pattern printed on the surface thereof, the metal pattern having an electronic component mounted thereon. The electronic component and a terminal of the heat-generating element are connected by means of the metal pattern.

5 Claims, 6 Drawing Sheets

(51) Int. Cl.
  *H02K 11/25* (2016.01)
  *H02K 11/33* (2016.01)
(58) Field of Classification Search
  USPC ............................................. 310/52–54, 64
  See application file for complete search history.

(56) References Cited

U.S. PATENT DOCUMENTS

| | | |
|---|---|---|
| 2014/0285969 A1 | 9/2014 | Kojima et al. |
| 2015/0008443 A1 | 1/2015 | Yamashita |
| 2018/0123546 A1 | 5/2018 | Kagawa et al. |
| 2018/0138810 A1 | 5/2018 | Hattori et al. |

FOREIGN PATENT DOCUMENTS

| | | | | |
|---|---|---|---|---|
| CN | 108019330 A | 5/2018 | | |
| DE | 10 2014 102 899 A1 | 9/2014 | | |
| EP | 2964004 A2 * | 1/2016 | ........ H01L 23/49811 |
| JP | 2004111619 A * | 4/2004 | |
| JP | 2004186504 A * | 7/2004 | |
| JP | 2011-87084 A | 3/2011 | |
| JP | 2011-114968 A | 6/2011 | |
| JP | 4898931 B2 * | 3/2012 | ............. F04B 35/04 |
| JP | 2015-29403 A | 2/2015 | |
| JP | 2016-208626 A | 12/2016 | |

OTHER PUBLICATIONS

Written Opinion of the International Searching Authority for International Application No. PCT/JP2020/016771, dated Jul. 21, 2020, with an English translation.

* cited by examiner

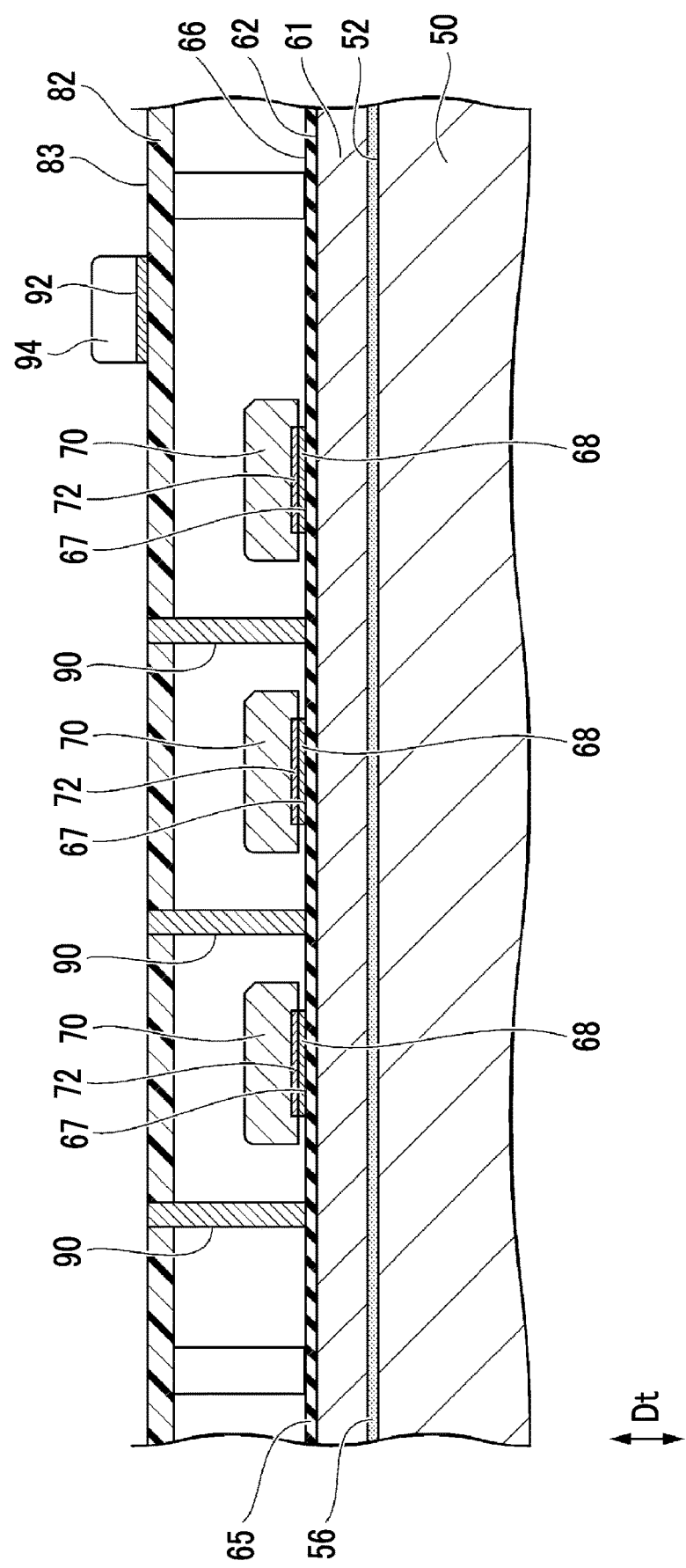

VEHICLE-MOUNTED ELECTRIC COMPRESSOR

TECHNICAL FIELD

The present invention relates to a vehicle-mounted electric compressor.

Priority is claimed on Japanese Patent Application No. 2019-079332 filed on Apr. 18, 2019, the content of which is incorporated herein by reference.

BACKGROUND ART

An electric compressor (vehicle-mounted electric compressor) is built into a vehicle that travels by means of electric power like an electric vehicle or a fuel☐cell vehicle. The electric compressor is used for a car air conditioner and the like. In recent years, there has been a demand for an electric compressor having a high cooling performance for the purpose of cooling a battery as vehicles sizes increase.

The electric compressor includes an electric motor and an inverter that supplies an electric current to the motor. The inverter includes a heat-generating element that is mainly composed of a semiconductor and is provided in an internal space of a housing of the electric compressor. For example, PTL 1 discloses an electric compressor in which a substrate on which a heat-generating element is disposed is fixed to a holding surface of a housing by means of a pressing piece made of metal or resin. In the case of the electric compressor disclosed in PTL 1, the substrate is in contact with the holding surface of the housing which serves as a cooling surface so that the cooling performance is improved.

CITATION LIST

Patent Literature

[PTL 1] Japanese Unexamined Patent Application Publication No. 2011-67064

SUMMARY OF INVENTION

Technical Problem

However, in the case of the electric compressor disclosed in PTL 1 as described above, it is necessary to use a heat-generating element with a small thickness tolerance in order to press the substrate onto the holding surface of the housing by means of the pressing piece. Therefore, an inexpensive heat-generating element cannot be used and thus the cost of the electric compressor is high.

As a method of accommodating the substrate into the housing in a different way from a method of fixing the substrate onto the holding surface of the housing with the pressing piece, a method has been proposed in which a metal substrate 61 is disposed on a holding surface 52 of a housing 50 with a heat radiation material 56 interposed therebetween and heat-generating elements 70 are disposed on the metal substrate 61 as shown in FIG. 7. An insulation layer 65 is provided on an element-facing surface 62 of the metal substrate 61. Electrically conductive layers 68 are provided on element installation regions 67 of an element-facing surface 66 of the insulation layer 65. The heat-generating elements 70 include metal layers 72 and the metal layers 72 are in contact with the electrically conductive layers 68.

In the above-described configuration, the electrically conductive layers 68 are provided only on the element-facing surface 66. Therefore, there is a limit in increasing the density of the heat-generating elements 70 and the cooling performance of an inverter. Therefore, in the inverter shown in FIG. 7, a resin substrate 82 that is approximately parallel to the metal substrate 61 is provided to be separated from the metal substrate 61 in a plate thickness direction Dt of the metal substrate 61. A metal pattern 92 is printed on a predetermined region of an element disposition surface 83 of the resin substrate 82. An electronic component 94 is provided on the resin substrate 82 with the metal pattern 92 interposed therebetween. The metal substrate 61 and the resin substrate 82 are connected to each other by inter-substrate terminals 90 that extend along the plate thickness direction Dt and that are electrically conductive. The electrically conductive layers 68 and the inter-substrate terminals 90 are connected to each other and the inter-substrate terminals 90 and the metal pattern 92 are connected to each other at positions different from the cross section shown in FIG. 7.

However, in the case of the configuration shown in FIG. 7, installing the inter-substrate terminals 90 requires time and costs and laying out the electrically conductive layer 68 or signal lines becomes complicated in accordance with the installation positions of the element installation regions 67 or the inter-substrate terminals 90 and requires time and costs. That is, there is a problem in that the electric compressor having the configuration as shown in FIG. 7 is difficult to manufacture.

The present invention provides a vehicle-mounted electric compressor excellent in cooling performance and easy to manufacture.

Solution to Problem

According to a first aspect of the present invention, there is provided a vehicle-mounted electric compressor including a compressor body that includes a motor compressing a refrigerant and an inverter that includes a power element supplying an electric current to the motor. The power element includes a metal substrate that includes an electrically conductive layer provided on a partial region of a surface of the metal substrate, a heat-generating element that includes a metal layer soldered onto the electrically conductive layer, and a resin substrate that is disposed such that the resin substrate and the metal substrate are arranged in a plate thickness direction of the metal substrate and that has a metal pattern printed on a surface of the resin substrate and an electronic component mounted on the metal pattern. The electronic component and a terminal of the heat-generating element are connected to each other via the metal pattern.

In the above-described aspect, a temperature sensor that detects a heat-generating temperature of the heat-generating element may be provided.

In the above-described embodiment, the power element may further include a spacer that fixes the metal substrate and the resin substrate to each other.

Advantageous Effects of Invention

According to the present invention, a vehicle-mounted electric compressor that has a high cooling performance and that is easy to manufacture is provided.

BRIEF DESCRIPTION OF DRAWINGS

FIG. 7 is a schematic cross-sectional view showing the configuration of a main part of an inverter in an electric compressor in the related art.

DESCRIPTION OF EMBODIMENTS

Hereinafter, an embodiment of an electric compressor according to the present invention will be described with reference to the drawings.

Figure 1:
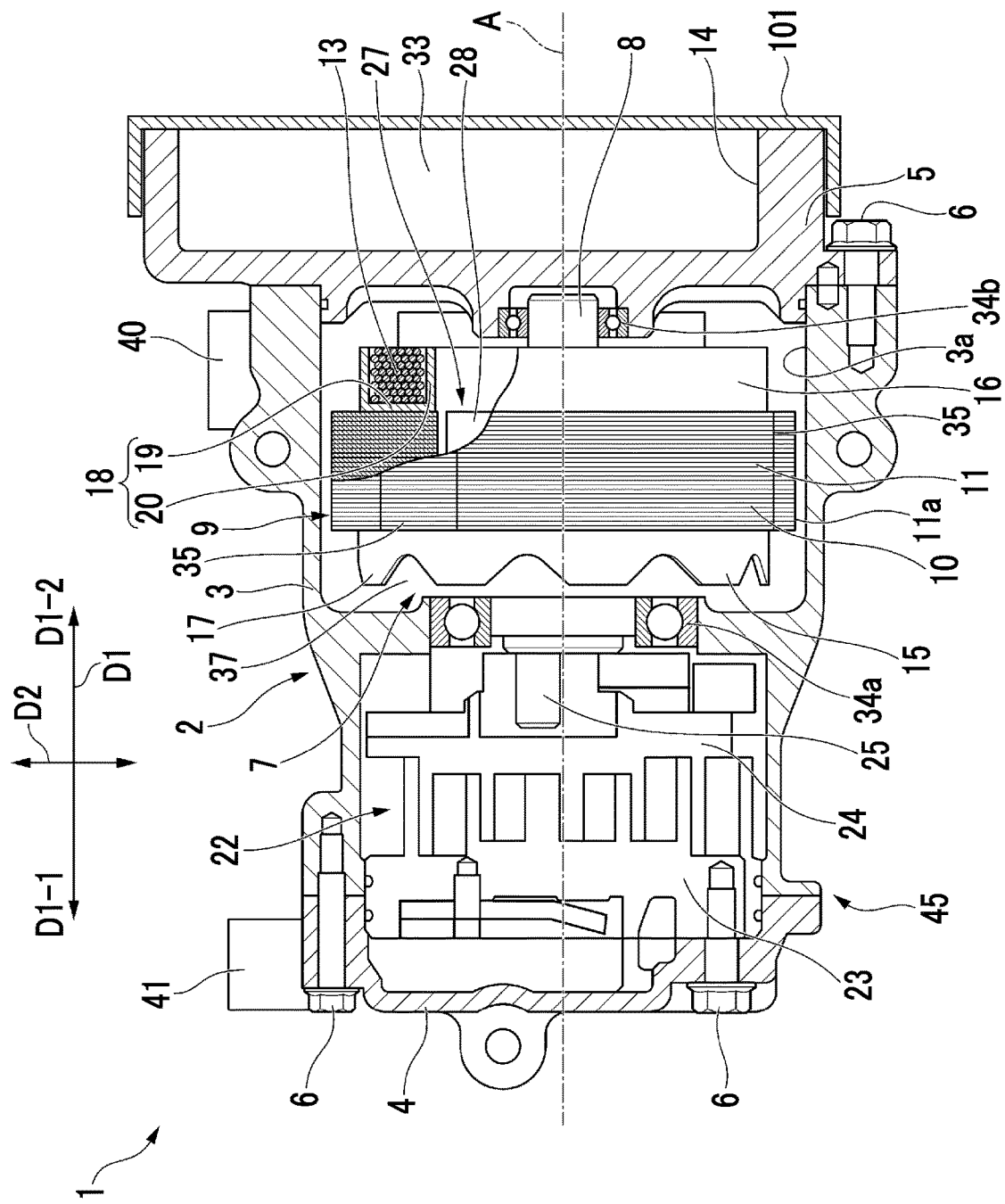
FIG. 1 is a schematic cross-sectional view showing the configuration of an electric compressor according to an embodiment of the present invention.

FIG. 1 is a schematic cross-sectional view showing the configuration of an electric compressor (vehicle-mounted electric compressor) 1 according to the embodiment of the present invention. The electric compressor 1 is a relatively small electric compressor that is used for a car air conditioner of a vehicle such as an automobile.

Figure 2:
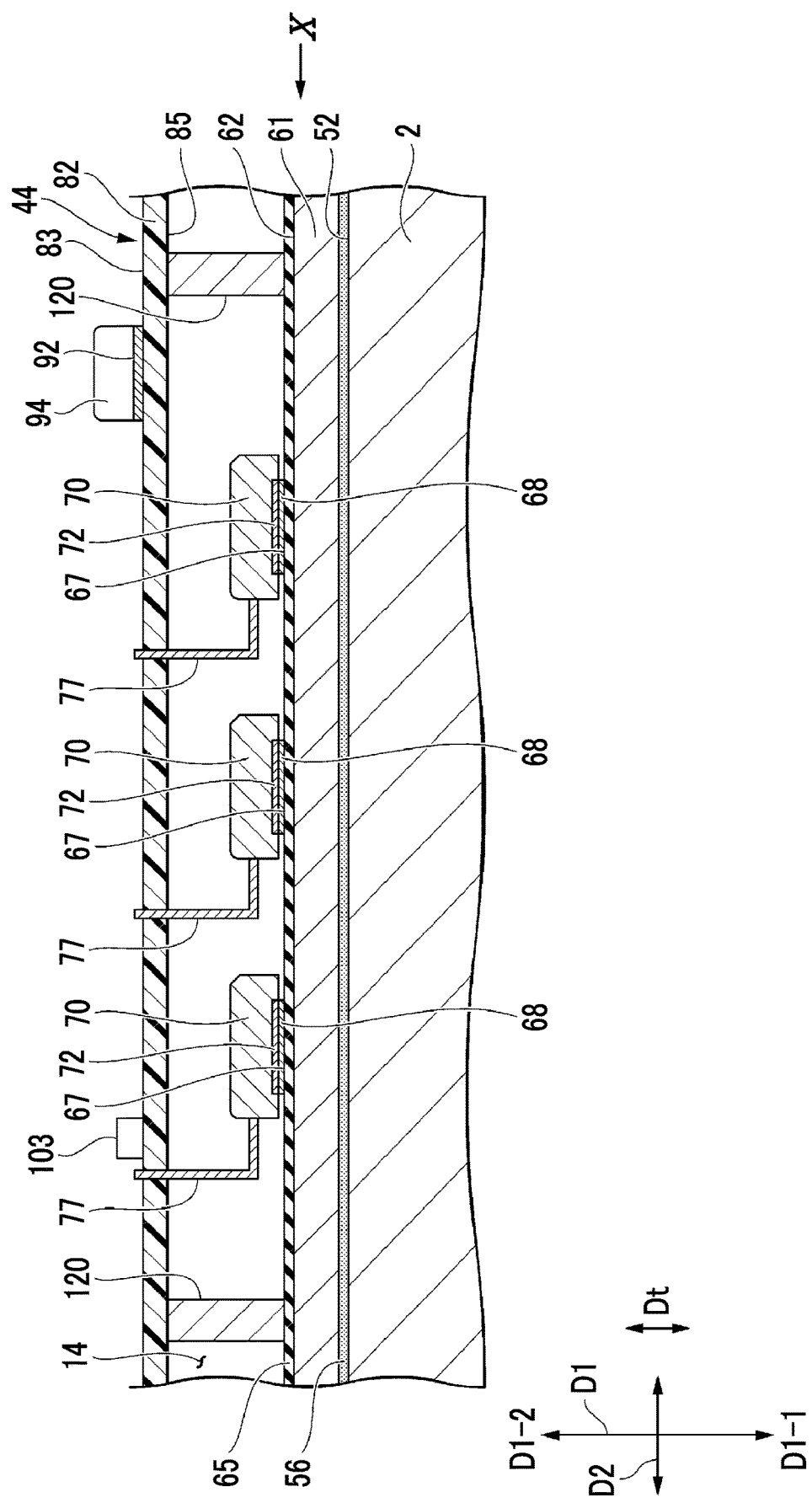
FIG. 2 is a schematic cross-sectional view showing the configuration of an inverter in the electric compressor shown in FIG. 1.

As shown in FIG. 1, the electric compressor 1 includes at least a compressor body 45, an inverter 33, and a temperature sensor 103. The compressor body 45 includes a housing 2 forming an outer shell, an electric motor (motor) 7 provided in an internal space of the housing 2, and a compressor 22 provided in the internal space of the housing 2. The temperature sensor 103 is not shown in FIG. 1 and is shown in FIG. 2.

The electric compressor 1 is connected to a refrigerant circuit (not shown). That is, the electric compressor 1 is incorporated into the refrigerant circuit including a condenser, an expansion valve, an evaporator, and the like and is a machine that compresses a refrigerant (not shown) flowing in pipes of the refrigerant circuit.

In the following description, a direction in which an axis A of a rotating shaft 8 of the electric motor 7 extends will be referred to as an axial direction D1. In addition, a direction orthogonal to the axis A will be referred to as a radial direction D2, a side away from the axis A in the radial direction D2 will be referred to as a radial outer side, and a side close to the axis A in the radial direction D2 will be referred to as a radial inner side. In addition, a side close to the compressor 22 in the axial direction D1 will be referred to as a first side D1-1 in the axial direction and a side close to the electric motor 7 will be referred to as a second side D1-2 in the axial direction.

The inverter 33 converts a direct current supplied from a storage battery on the outside of the electric compressor 1 into a three-phase alternating current (electric current) and supplies the three-phase alternating current to the electric motor 7. In addition, the inverter controls the operation of the electric motor 7 by controlling supply of the electric current to the electric motor 7.

The housing 2 is formed of a metal such as an aluminum alloy mainly composed of aluminum (Al). The housing 2 includes a main housing 3, a first end portion housing 4, and a second end portion housing 5. The main housing 3 extends in the axial direction D1 and is formed in an approximately cylindrical shape. The first end portion housing 4 is coupled to the first side D1-1 in the axial direction of the main housing 3. The second end portion housing 5 is coupled to the second side D1-2 in the axial direction of the main housing 3. The first end portion housing 4 and the second end portion housing 5 are fixed to the main housing 3 by means of bolts 6.

A refrigerant inlet 40, which is a refrigerant introduction inlet, and a refrigerant outlet 41, which is a refrigerant discharge port, are formed in the housing 2. The refrigerant inlet 40 is provided in the vicinity of an end portion of the housing 2 that is on the second side D1-2 in the axial direction. The refrigerant inlet 40 is formed such that a refrigerant is introduced from the second side D1-2 in the axial direction of the electric motor 7. The refrigerant outlet 41 is provided in the vicinity of an end portion of the housing 2 that is on the first side D1-1 in the axial direction.

The electric motor 7 includes a stator 9 and a rotor 27. The rotor 27 is formed in a cylindrical shape and is rotatably disposed inside the stator 9 with a predetermined interval provided therebetween. The stator 9 is formed in a cylindrical shape and a predetermined gap is provided between the stator 9 and an inner peripheral surface 3a of the main housing 3.

The electric motor 7 receives electric power (electric current) from the inverter 33 to generate a rotational force. The electric motor 7 is connected to an orbiting scroll 24 of the compressor 22 by the rotating shaft 8 and the orbiting scroll 24 is rotationally driven around the axis A by the generated rotational force. The compressor 22 includes a fixed scroll 23 and the orbiting scroll 24.

The rotating shaft 8 is rotatably supported in the housing 2 via bearings 34a and 34b. An end portion of the rotating shaft 8 that is on the first side D1-1 in the axial direction is coupled to a shank 25 of the orbiting scroll 24 of the compressor 22 and rotationally drives the orbiting scroll 24. The compressor 22 compresses the refrigerant sucked in from the refrigerant inlet 40 with the fixed scroll 23 and the orbiting scroll 24 revolving in a state of being eccentric to each other.

The stator 9 includes a stator core 10, a first coil end bobbin 15, a second coil end bobbin 16, and a coil 13. The stator core 10 is formed in an annular shape.

The first coil end bobbin 15 is disposed on the first side D1-1 in the axial direction of the stator core 10. The second coil end bobbin 16 is disposed on the second side D1-2 in the axial direction of the stator core 10. The coil 13 is wound around teeth of the stator core 10 and the first coil end bobbin 15 and the second coil end bobbin 16.

The rotor 27 includes a rotor core 28 having a cylindrical shape that is configured by laminating a required number of thin electromagnetic steel plates (thin steel plates) formed through punching.

The stator core 10 is a laminate configured by laminating a required number of electromagnetic steel plates formed in an annular shape through punching. The stator core 10 includes s a stator core body 11. The stator core is formed with large recessed portions 35 and small recessed portions (not shown). The stator core body 11 is formed in a cylindrical shape. A plurality of the large recessed portions 35 are formed on an outer peripheral surface 11a of the stator core body 11 to extend in the axial direction D1 and are refrigerant flow paths. A plurality of the small recessed portions are formed on the outer surface of the large recessed portions 35 and the outer peripheral surface 11a of the stator core body 11.

The first coil end bobbin 15 includes a ring portion having a cylindrical shape and a plurality of hook portions 18. The hook portions 18 are provided on an inner peripheral side of the ring portion 17 at approximately equal intervals in a circumferential direction.

An outer diameter of the first coil end bobbin 15 is slightly smaller than an outer diameter of the stator core 10. An inner diameter of the first coil end bobbin 15 is slightly larger than an inner diameter of the stator core 10. The first coil end bobbin 15 is formed of an insulating material such as polybutylene terephthalate resin, for example.

Each of the hook portions 18 has a plate shape and includes a hook body portion 19 and a coil holding portion 20. The hook body portion 19 protrudes toward an inner peripheral side in the radial direction from an end portion of the ring portion 17 that is on the second side D1-2 in the axial direction. The coil holding portion 20 protrudes to be closer to the first side D1-1 in the axial direction than an end portion of the hook body portion 19 that is on an inner side in the radial direction.

A plurality of through-grooves 37 penetrating the ring portion 17 in the radial direction D2 are formed in the ring portion 17. The second coil end bobbin 16 is formed in the same shape as the first coil end bobbin 15 except that no through-groove 37 is formed therein.

In the above-described configuration, a refrigerant sucked in through the refrigerant inlet 40 reaches the compressor 22 while cooling the electric motor 7 and is discharged through the refrigerant outlet 41 after being compressed by the compressor 22. That is, the electric motor 7 compresses the refrigerant by means of the rotational force thereof. A large part of the refrigerant flows through the large recessed portions 35 when passing through the electric motor 7. Since the plurality of small recessed portions are provided, the area of heat transfer of the stator core 10 is increased and efficiency of the cooling of the stator 9 that is performed by means of the refrigerant is improved. Accordingly, an increase in temperature of the stator 9 is suppressed.

The inverter 33 is accommodated in an accommodation recessed portion 14 of the housing 2. The accommodation recessed portion 14 is covered with an inverter cover 101 and is protected from external dust and the like. Note that, in FIG. 1, the shape of the inverter 33 is not shown.

FIG. 2 is a schematic cross-sectional view showing the configuration of a main part of the inverter 33 in the electric compressor 1 shown in FIG. 1. The inverter 33 includes a power element 44 that supplies the above-described electric power (electric current) to the electric motor 7. As shown in FIG. 2, the power element 44 includes a metal substrate 61, heat-generating elements 70, a resin substrate 82, and spacers 120.

The metal substrate 61 is held on a holding surface 52 via a heat radiation material 56 such as thermal paste, the holding surface 52 being on the first side D1-1 in the axial direction in the accommodation recessed portion 14. An element-facing surface 62 is provided on a surface of the metal substrate 61 that is on a side opposite to a surface in contact with the heat radiation material 56, that is, on the second side D1-2 in the axial direction. An insulation layer 65 is provided on the element-facing surface 62.

Figure 3:
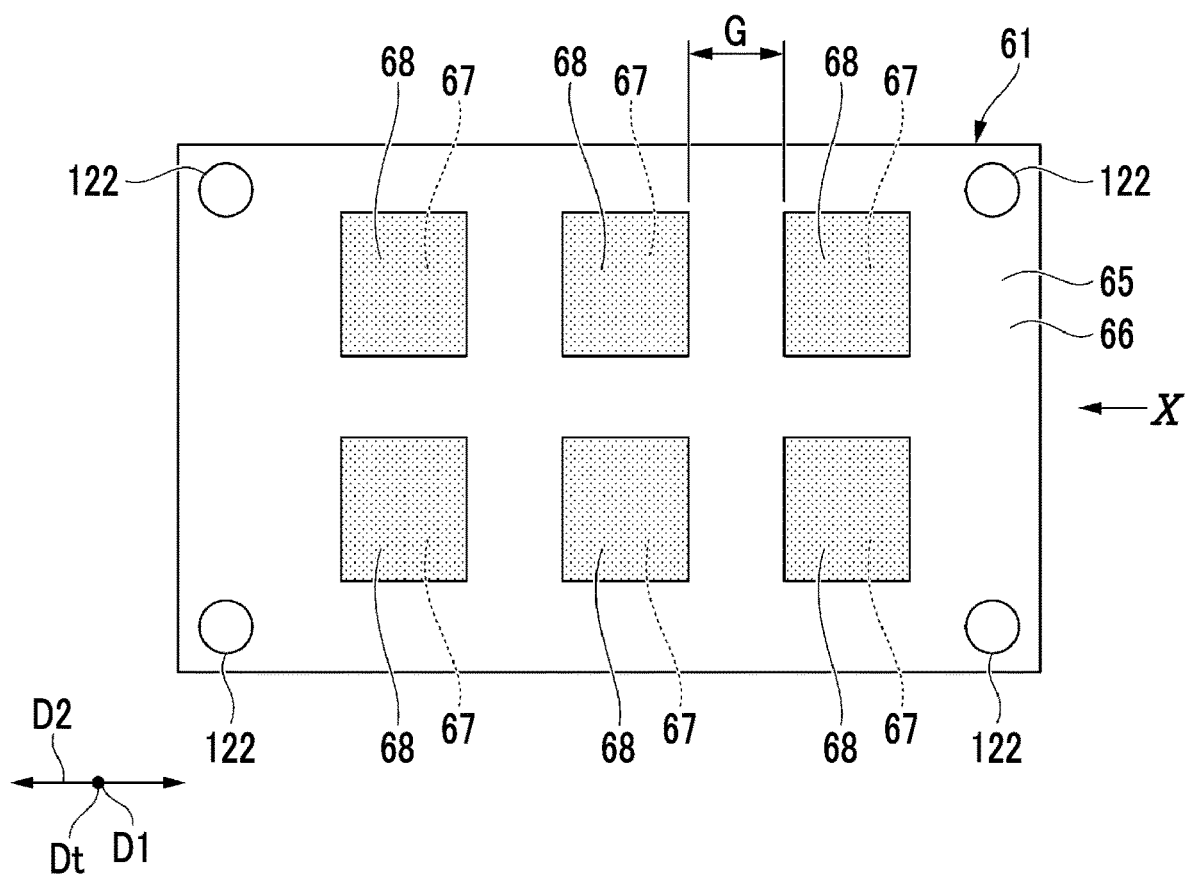
FIG. 3 is a plan view of a metal substrate of a power element of the inverter shown in FIG. 2.

FIG. 3 is a plan view of the metal substrate 61 and is a view showing the first side D1-1 in the axial direction as seen from the second side D1-2 in the axial direction along the axial direction D1. As shown in FIG. 3, electrically conductive layers 68 are provided on element installation regions (regions) 67 of an element-facing surface (surface) 66 of the insulation layer 65. The element installation regions 67 and the electrically conductive layers 68 have approximately the same shape as metal layers 72 (which will be described later) as seen in a plan view. In a plane orthogonal to the axial direction D1 and a plate thickness direction Dt, a gap G between the element installation region 67 and the electrically conductive layer 68 is approximately the same as the creepage distance between the electrically conductive layers 68. Through-holes 122 that penetrate the metal substrate 61 in the axial direction D1 and the plate thickness direction Dt are formed at the corners of the metal substrate 61.

The metal substrate 61 is formed of, for example, aluminum (Al) or copper (Cu). The insulation layer 65 is formed of, for example, any kind of insulating resin. The metal layer 72 is formed of, for example, copper (Cu).

The heat-generating elements 70 are discrete type semiconductors, and are, for example, switching elements such as metal oxide semiconductor field effect transistors (MOS-FETs) or insulated gate bipolar transistors (IGBTs). As described above, the heat-generating elements 70 convert DC power input from the external storage battery into electric power of any one phase of three-phase AC. The heat-generating elements 70 generate heat by means of electric currents flowing therethrough.

Figure 4:
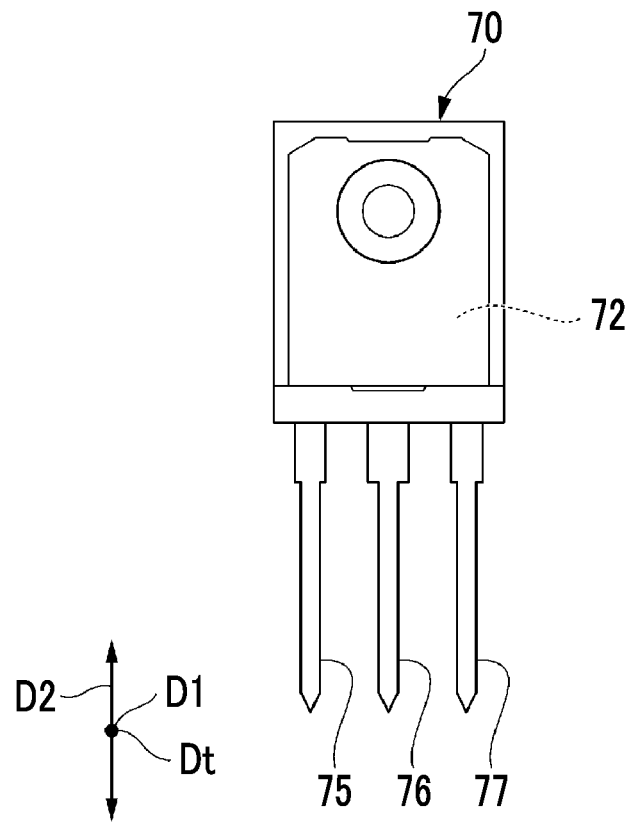
FIG. 4 is a plan view of a heat-generating element of the power element of the inverter shown in FIG. 2.

In the present embodiment, it will be assumed that the heat-generating elements 70 are MOS-FETs. FIG. 4 is a plan view of the heat-generating element 70 and is a view showing the first side D1-1 in the axial direction as seen from the second side D1-2 in the axial direction along the axial direction D1. The heat-generating element 70 includes three terminals 75, 76, and 77. The terminal 75 is a gate terminal in the MOS-FET. The terminal 76 is a drain terminal in the MOS-FET. The terminal 77 is a source terminal in the MOS-FET. Each of the terminals 75, 76, and 77 is bent toward the resin substrate 82 along the plate thickness direction Dt at an intermediate portion in a longitudinal direction thereof. Note that, in FIG. 2, the terminals 75 and 76 are not shown.

Each heat-generating element 70 includes the metal layer 72. The metal layer 72 is provided on a surface of the heat-generating element 70 that faces the metal substrate 61 and serves as a heat radiation portion of the heat-generating element 70. The shape of the metal layer 72 is appropriately determined in accordance with the shape of the entire heat-generating element 70. As shown in FIG. 2, the metal layers 72 are in contact with the electrically conductive layers 68 and are soldered to the electrically conductive layers 68.

The resin substrate 82 is disposed such that the resin substrate 82 and the metal substrate 61 are arranged in the plate thickness direction Dt with a predetermined interval provided between the resin substrate 82 and the metal substrate 61. A metal pattern 92 is printed on an element disposition surface 83 of the resin substrate 82. Through-holes (not shown) that penetrate the resin substrate 82 in the axial direction D1 and the plate thickness direction Dt are formed at corners of the resin substrate 82 as seen in a plan view.

The resin substrate 82 is a so-called printed circuit board. Resin constituting the resin substrate 82 is the same as resin constituting a known printed circuit board. The metal pattern 92 is formed of a metal constituting a metal pattern laid out on a known printed circuit board and is formed of, for example, copper.

Any electronic component 94 is mounted on the metal pattern 92. The electronic component 94 is an electronic component other than the heat-generating elements 70, which is necessary for driving of the inverter 33 and electric control of the metal substrate 61 and the resin substrate 82.

The electronic component 94 and each of the terminals 75, 76, and 77 are physically or electrically connected to each other via the metal pattern 92. In the present embodiment, as described above, the terminals 75, 76, and extending in the radial direction D2 from the heat-generating elements 70 are bent toward the resin substrate 82 along the plate thickness direction Dt and the terminals 75, 76, and 77 penetrate the resin substrate 82 from the first side D1-1 in the axial direction to the second side D1-2 in the axial direction along the axial direction D1 after being bent. Tips of the terminals 75, 76, and 77 are connected to the metal pattern 92 at positions different from the cross section shown in FIG. 2.

The temperature sensor 103 is mounted at any position on the resin substrate 82 so that the temperature sensor 103 can detect temperatures of the heat-generating elements 70. That is, any position as described above means a position on the resin substrate 82 where the temperatures of the heat-generating elements 70 can be detected. In FIG. 2, the temperature sensor 103 is provided on the element disposition surface 83. However, the temperature sensor 103 may be provided on a heat-generating element facing surface 85 that is on a side opposite to the element disposition surface 83 of the resin substrate 82. Note that, although only one temperature sensor 103 is shown in FIG. 2, a plurality of the temperature sensors 103 may be provided in accordance with the number of heat-generating elements 70 and the positions thereof relative to the heat-generating elements 70. For example, the same number of temperature sensors 103 as the heat-generating elements 70 may be provided.

The spacers 120 are columnar members formed of, for example, aluminum (Al) or copper (Cu). The spacers 120 extend along the axial direction D1. Both end portions of each spacer 120 are inserted into through-holes 122 and through-holes formed in the resin substrate 82 which overlap each other when the first side D1-1 is seen from the second side D1-2 along the axial direction D1. Accordingly, the metal substrate 61 and the resin substrate 82 are connected to each other via the spacers 120.

The electric compressor 1 of the present embodiment described above includes the compressor body 45 and the inverter 33. The power element 44 of the inverter 33 includes the metal substrate 61 that includes electrically conductive layers 68 on the element installation regions 67 on a portion of the element-facing surface 66, the heat-generating elements 70 that include metal layers 72 soldered onto the electrically conductive layers 68, and the resin substrate 82 that is disposed such that the resin substrate and the metal substrate 61 are arranged in the plate thickness direction Dt and that has the metal pattern 92 printed on the element disposition surface 83 and the electronic component 94 mounted on the metal pattern 92. The electronic component 94 and the terminals 77 of the heat-generating elements 70 are connected to each other via the metal pattern 92. According to the electric compressor configured as described above, unlike an electric compressor (refer to FIG. 7) in the related art, no time and costs are required to install inter-substrate terminals and no time and costs are required to lay out the electrically conductive layers 68 or signal lines in accordance with the installation positions of the element installation regions 67 or the inter-substrate terminals 90 in a complicated manner. Therefore, it is possible to easily manufacture the electric compressor 1. In addition, since the heat-generating elements 70 are disposed in the element installation regions 67 at a high density with the gaps G provided therebetween and the electronic component 94 other than the heat-generating elements 70 is disposed on the metal pattern 92 of the resin substrate 82, it is possible to improve the cooling performance of the inverter 33 or to maintain a high cooling performance.

Figure 5:
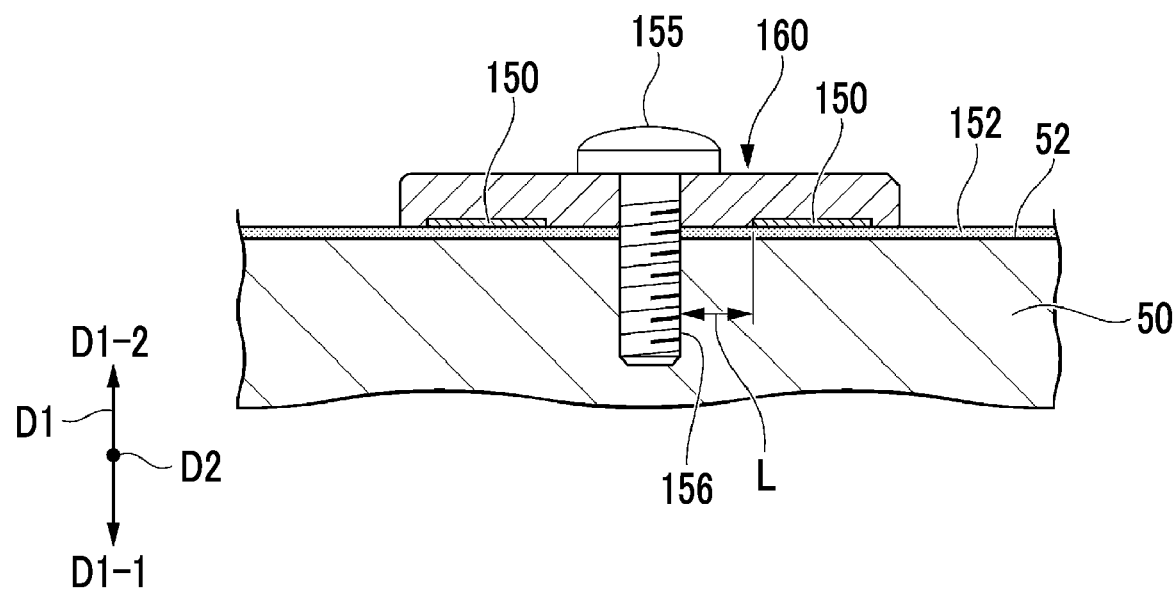
FIG. 5 is a schematic cross-sectional view showing the configuration of a main part of an inverter in an electric compressor in the related art.

In addition, in the electric compressor 1 of the present embodiment, the metal substrate 61, on which the plurality of element installation regions 67 and the plurality of electrically conductive layers 68 are formed with the gaps G being approximately the same pattern as the creepage distance between the electrically conductive layers 68 in a plane orthogonal to the axial direction D1 and the plate thickness direction Dt, can be used. For example, FIG. 5 is a schematic cross-sectional view showing the configuration of a main part of an inverter in an electric compressor in the related art. In the related art, as shown in FIG. 5, a heat-generating element 160 including a plurality of back surface electrodes 150 is screwed into a holding surface 52 of a housing 50 via an insulation sheet 152 in some cases. However, in such a configuration in the related art, a shortest distance L between a shank 156 of a metal screw 155 and the back surface electrode 150 in the radial direction D2 may be equal to or smaller than a creepage distance required for the back surface electrodes 150. Accordingly, malfunction of a power element or the inverter may occur.

Figure 6:
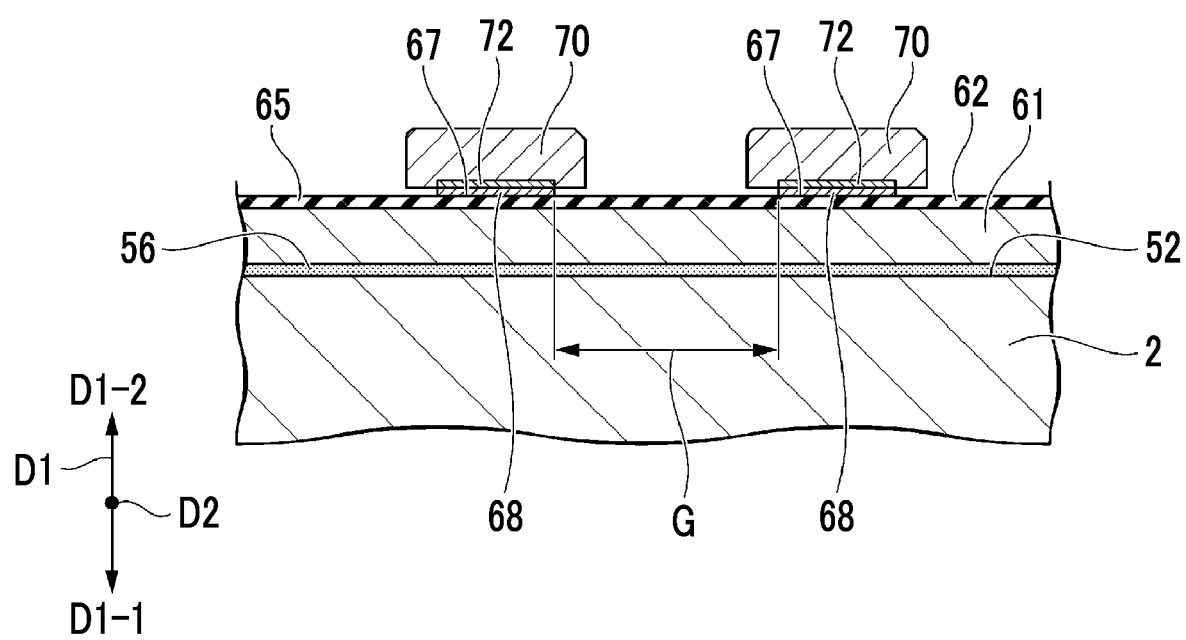
FIG. 6 is a schematic cross-sectional view showing the configuration of a main part of the power element as seen from a direction X shown in FIGS. 2 and 3.

FIG. 6 is a schematic cross-sectional view showing the configuration of a main part of the power element 44 as seen from a direction X shown in FIGS. 2 and 3. According to the electric compressor 1 of the present embodiment, as shown in FIG. 6, an interval G is secured to be approximately the same as the creepage distance between the electrically conductive layers 68. Therefore, if the heat-generating elements 70 are disposed such that the metal layers 72 come into contact with the electrically conductive layers 68, malfunction of the power element 44 or the inverter 33 can be prevented.

In addition, in the case of a method in which a substrate is fixed to a holding surface of a housing by means of a pressing piece as disclosed in PTL 1 or a method in which a substrate is screwed as described above, the fastening strength of the pressing piece or a screw may be lessened due to long-term vibration or the like applied thereto and the power element may be damaged. However, according to the electric compressor 1 of the present embodiment, since the metal layers 72 are soldered onto the electrically conductive layers 68, the heat-generating elements 70 are firmly fixed to the metal substrate 61 and damage to the power element 44 can be prevented.

In addition, according to the electric compressor 1 of the present embodiment, since the temperature sensor 103 that can detect heat-generating temperatures of the heat-generating elements 70 are further provided, it is possible to measure the temperatures and heat dissipation characteristics of the heat-generating elements 70 based on the heat-generating temperatures of the heat-generating elements 70 and to measure and cope with the influence thereof on solder fixing the metal layers 72 and the electrically conductive layers 68. In order to cope with the influence as described above, the resin substrate 82 may be provided with a temperature control element. In addition, according to the electric compressor 1 of the present embodiment, it is possible to measure the temperatures and the heat dissipation characteristics of the heat-generating elements 70 based on the heat-generating temperatures of the heat-generating elements 70 and to detect malfunction or the like before the power element 44 fails.

In addition, according to the electric compressor 1 of the present embodiment, since the power element 44 further includes the spacers 120 fixing the metal substrate 61 and the resin substrate 82 to each other, it is possible to stably support the resin substrate 82 with respect to the metal substrate 61, reduce a load onto the terminals 77, and prevent damage to the terminals 77.

Although a preferred embodiment of the present invention has been described in detail above, the present invention is not limited to the above-described embodiment. In the present invention, various modifications can be made within the scope of the gist of the present invention described in claims.

REFERENCE SIGNS LIST

33 inverter
44 power element
45 compressor body
61 metal substrate
68 electrically conductive layer
72 metal layer
77 terminal
82 resin substrate

The invention claimed is:

1. A vehicle-mounted electric compressor comprising:
a compressor body that includes a motor compressing a refrigerant; and
an inverter that includes a power element supplying an electric current to the motor,
wherein the power element includes
a metal substrate that includes electrically conductive layers provided on a partial region of a surface of the metal substrate,
a heat-generating element that includes a metal layer soldered onto each of the electrically conductive layers, and
a resin substrate that is disposed such that the resin substrate and the metal substrate are arranged in a plate thickness direction of the metal substrate and that has a metal pattern printed on a surface of the resin substrate and an electronic component mounted on the metal pattern, and
the electronic component and a terminal of the heat-generating element are connected to each other via the metal pattern,
each of the electrically conductive layer overlaps to the metal layer in a plane orthogonal to the plate thickness direction and has the same shape as the layer as seen in a plan view, and
a gap between adjacent electrically conductive layers is same as the creepage distance.

2. The vehicle-mounted electric compressor according to claim 1, further comprising:
a temperature sensor that detects a heat-generating temperature of the heat-generating element.

3. The vehicle-mounted electric compressor according to claim 1,
wherein the power element further includes a spacer that fixes the metal substrate and the resin substrate to each other.

4. The vehicle-mounted electric compressor according to claim 2,
wherein the power element further includes a spacer that fixes the metal substrate and the resin substrate to each other.

5. The vehicle-mounted electric compressor according to claim 1,
wherein the heat-generating element is a metal oxide semiconductor field effect transistors and includes a gate terminal, a drain terminal and a source terminal, and
the gate terminal, the drain terminal and the source terminal expands from body of the metal substrate along the surface of the metal substrate, are bent toward the resin substrate along the plate thickness direction and are connected to the metal pattern.

* * * * *